(12) United States Patent
Waugh

(10) Patent No.: US 7,677,136 B2
(45) Date of Patent: Mar. 16, 2010

(54) PNEUMATIC TIRE PUNCTURE REPAIR DEVICE

(76) Inventor: Nathan Waugh, 217 Big Springs Rd., Elizabethton, TN (US) 37643

( * ) Notice: Subject to any disclaimer, the term of this patent is extended or adjusted under 35 U.S.C. 154(b) by 23 days.

(21) Appl. No.: 11/899,071

(22) Filed: Sep. 4, 2007

(65) Prior Publication Data

US 2008/0053277 A1 Mar. 6, 2008

Related U.S. Application Data

(60) Provisional application No. 60/824,603, filed on Sep. 5, 2006.

(51) Int. Cl.
*B29C 73/08* (2006.01)
(52) U.S. Cl. .................. 81/15.7; 152/370
(58) Field of Classification Search ............ 81/15.2, 81/15.4, 15.5, 15.6, 15.7; 404/6; D8/31; 157/1; 152/367, 370; 156/97
See application file for complete search history.

(56) References Cited

U.S. PATENT DOCUMENTS

| | | | |
|---|---|---|---|
| 570,155 A * | 10/1896 | Devore | 81/15.7 |
| 1,596,822 A | 8/1926 | Fuchs | |
| 1,897,028 A * | 2/1933 | Anderson | 81/15.7 |
| 2,759,635 A * | 8/1956 | Boyer | 152/370 |
| 2,762,413 A * | 9/1956 | Walter | 152/370 |
| 2,990,726 A | 7/1961 | Crandall | |
| 3,029,671 A | 4/1962 | Clifford | |
| 3,542,614 A | 11/1970 | Hopkins | |
| 3,773,097 A | 11/1973 | Mullins | |
| 3,837,243 A | 9/1974 | Mays | |
| 4,009,624 A | 3/1977 | Nishino | |
| 4,382,714 A * | 5/1983 | Hutchison | 404/6 |
| 4,548,102 A | 10/1985 | DiRocco | |
| 4,716,792 A | 1/1988 | Hector | |
| 4,995,756 A * | 2/1991 | Kilgrow et al. | 404/6 |
| 5,062,323 A | 11/1991 | Roberts et al. | |
| 5,350,481 A | 9/1994 | Shepard et al. | |
| 5,507,588 A * | 4/1996 | Marts et al. | 404/6 |
| 5,536,346 A | 7/1996 | Hendry et al. | |
| 5,609,715 A | 3/1997 | Gallentine | |
| 5,775,832 A * | 7/1998 | Kilgrow et al. | 404/6 |
| 6,170,361 B1 | 1/2001 | Yates | |
| 6,202,510 B1 | 3/2001 | Kupelian | |
| 6,382,019 B1 | 5/2002 | Hendry et al. | |
| 6,936,132 B2 | 8/2005 | Topolnitsky | |
| 7,051,622 B1 | 5/2006 | Chen | |
| 7,178,564 B2 | 2/2007 | Kojima et al. | |
| 2006/0117909 A1 | 6/2006 | Hsu | |

FOREIGN PATENT DOCUMENTS

WO WO 79/00938 A1 11/1979
WO WO 93/13932 A1 7/1993

* cited by examiner

*Primary Examiner*—David B Thomas
(74) *Attorney, Agent, or Firm*—Mark L. Davis

(57) ABSTRACT

A tire repairing assembly for inserting a resilient tire puncture plug into a punctured pneumatic tire. The assembly being adapted to be rolled over by the tire while still mounted to the wheel and the wheel mounted to the automobile. The tire repairing assembly having an arcuate base member and an insertion pin mounted to the base member. In an alternative embodiment, the insertion pin is moveably or pivotally mounted to the base member.

25 Claims, 4 Drawing Sheets

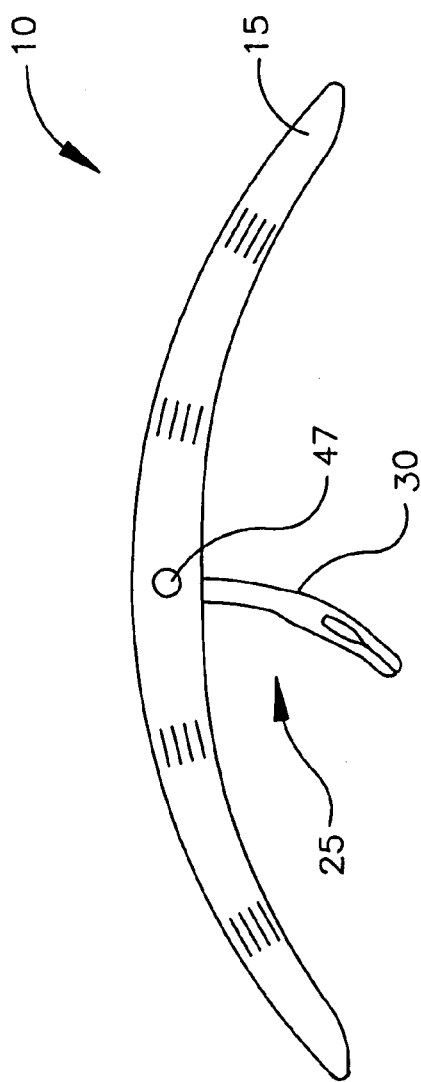
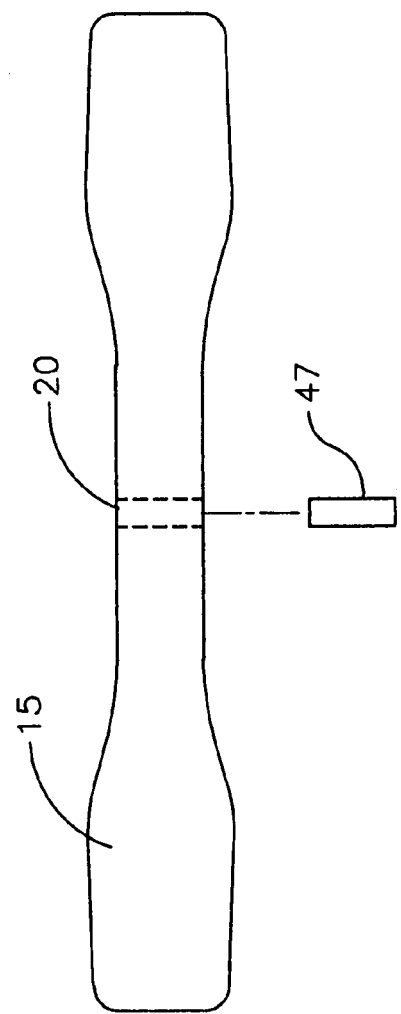

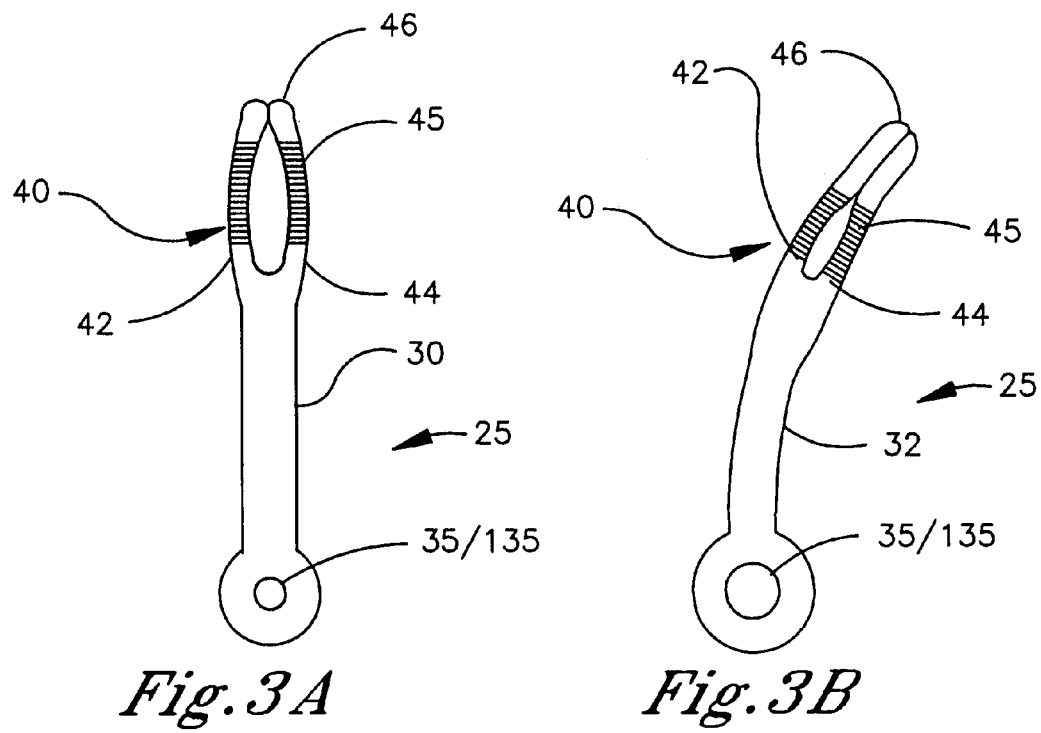
*Fig. 3A*  *Fig. 3B*
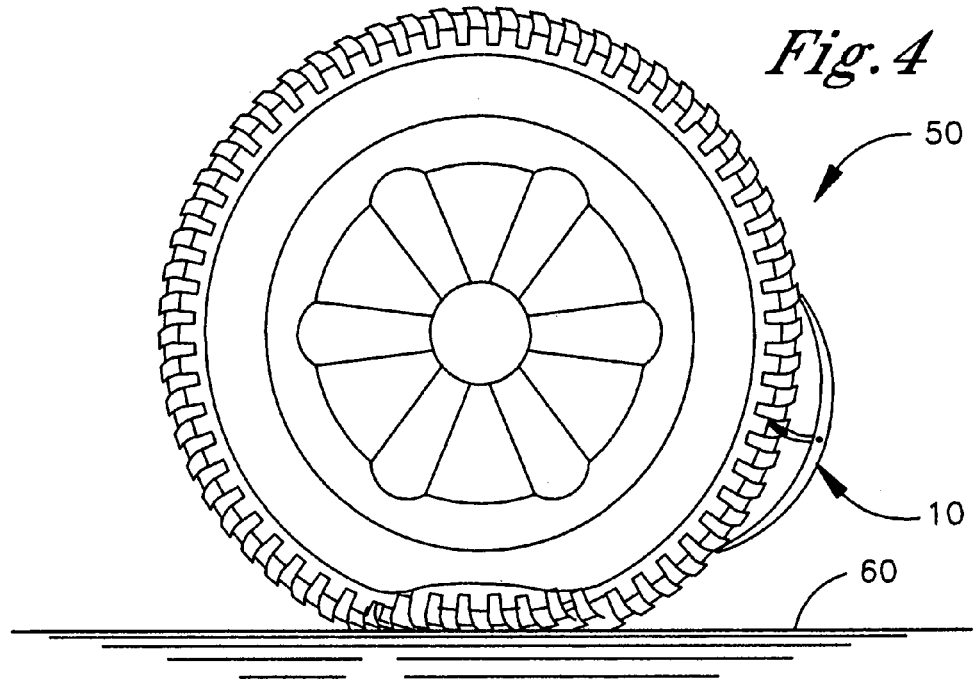
*Fig. 4*

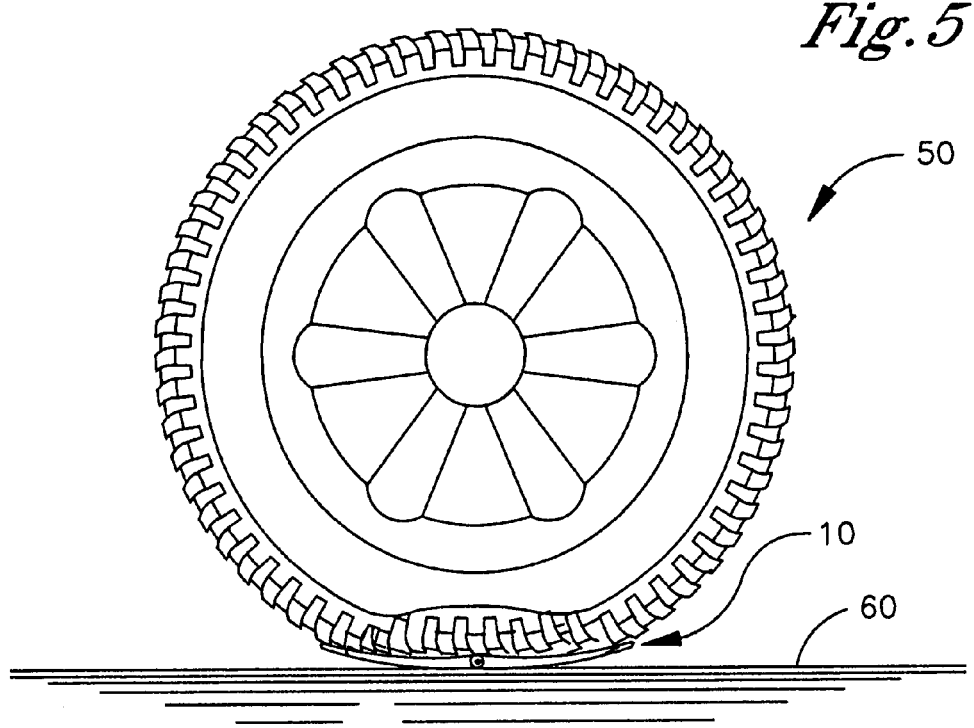
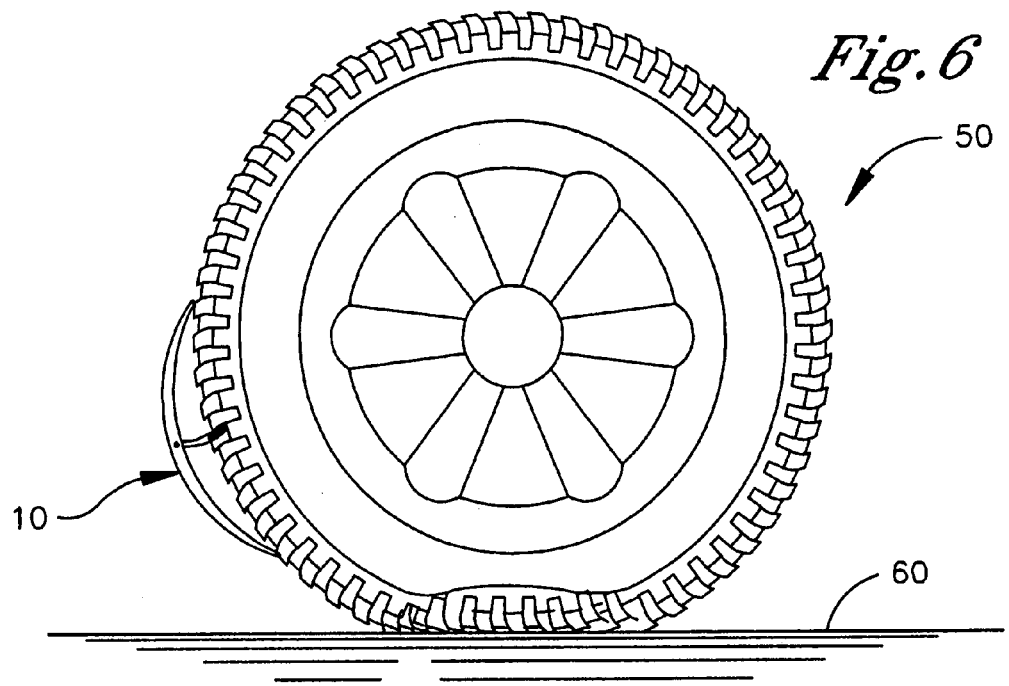

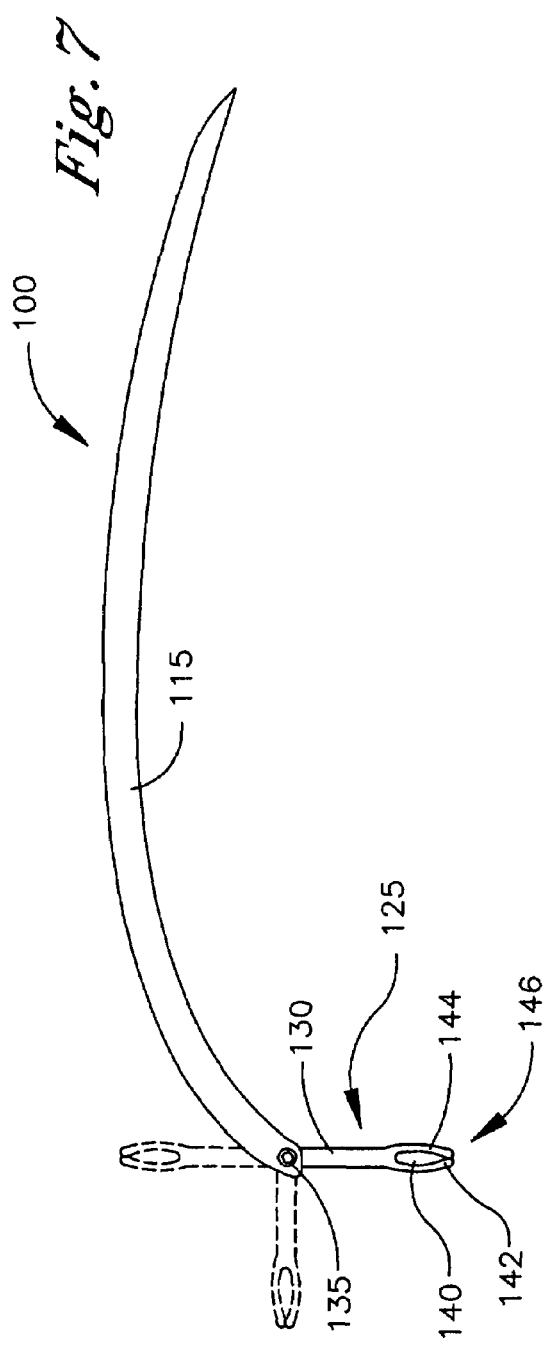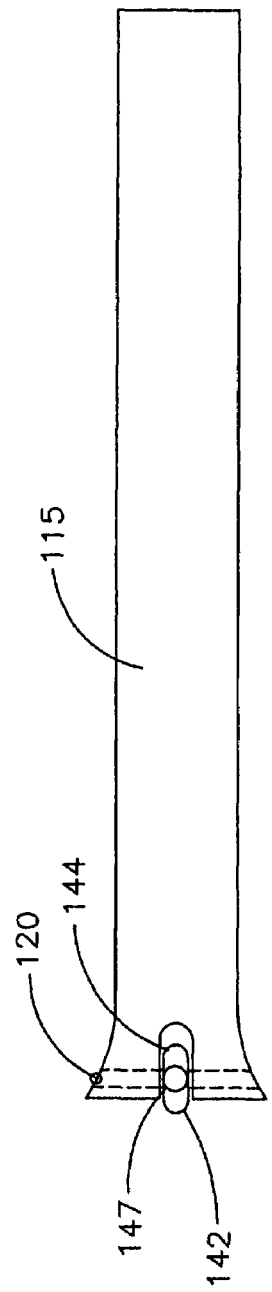

PNEUMATIC TIRE PUNCTURE REPAIR DEVICE

CROSS REFERENCE TO RELATED APPLICATIONS

Benefit is claimed to the earlier filed application having U.S. Ser. No. 60/824,603 filed Sep. 5, 2006 the entire disclosure of which is incorporated herein by reference.

BACKGROUND OF THE INVENTION

The present invention relates generally to a device for plugging a tubeless pneumatic tire. More particularly, the present invention relates to a device for plugging a tubeless pneumatic tire wherein a plugging means is inserted into a tire puncture without dismounting the tire from either the automobile or the wheel.

Tubeless tires are tires which are mounted on a wheel wherein the wheel forms a part of the seal to hold in air under pressure. The side of the tire has a bead which butts against a corresponding portion of the wheel rim forming an air-tight seal. As a result tubeless tires are difficult to remove from the wheel rim, even when they are flat. Special tools are generally required to remove the flat tire from the rim to enable a hole in the tire to be repaired. In recent years with the increase of price for oil and oil derived products, there has been a greater focus on repairing of tires when only slightly damaged.

Therefore, it is desirable to have a tool which allows a hole or puncture in a tubeless tire to be repaired without removing the tire from the wheel rim. Devices for repairing holes in tubeless tires without removing them from the rim are well known. A primary type of device for repairing holes in tubeless tires without removing the punctured tire from the rim on which they are mounted employ a substantially cylindrical rubber "plug" and a tool for inserting the plug into a hole. Several prior methods for repairing punctures in tubeless tires are known to have several disadvantages, including removal of the wheel assembly from the automobile. Additionally, tires of late include several layers of metallic and/or synthetic reinforcing cords. Thus, repairing tubeless tires where such repair devices attempted to place rubber elements into a puncture hole have not been practical, typically making insertions difficult and positioning uncertain. This procedure is more difficult to perform when the vehicle ride height is low, the puncture is on the inner edge of the tire, the tire is very large with thick treads, or the puncture hole is very narrow.

Prior attempts to produce a tire puncture device have resulted in devices that enlarge the opening initiated by the penetrating object. Generally, such devices include some means by which a person must forcibly insert a pointed device into the puncture. For example, U.S. Pat. Nos. 2,990,736; 3,029,671; and 4,009,624 disclose hand tools having a probe member or shaft that expands the hole, and a plug carrier or insertion channel. The tools include a pressure head or knob suitably configured to facilitate pressing the hand against it for forcing the shaft and plug into the hole.

However, a drawback of such tire puncture devices is that they have multiple components that include a tube or channel for inserting the plug. Such devices are cumbersome, generally require the tire to be, at a minimum, removed from the automobile and are expensive to fabricate.

U.S. Pat. No. 4,548,102 describes a tool for plugging a punctured tire where the plug is inserted from the inside of the tire. However, this requires not only the removal of the wheel from the automobile, but additionally the separation of the tire from the wheel rim.

U.S. Pat. No. 4,716,792 describes a screwdriver-type tool for plugging a punctured tire. The tool includes a hollow tubular shaft for providing support to the plug during compression or insertion of the plug into the puncture. The plug includes a pointed, hardened tip that has a shoulder for engaging the tubular shaft so that the plug can be manually pushed or forced into the hole from the penetrating object.

U.S. Pat. No. 6,170,361 discloses a tire repair device having a handle that includes a compartment defined therein for storing extra plugs, ratcheting means secured to the handle, a shaft attached to the ratchet means and having a plug hooking means and a reamer at an end of the shaft opposite from the point where the shaft attaches to the ratchet means.

U.S. Pat. No. 6,202,510 discloses a multi-component tire repair device having an elongated handle and a flanged wheel-engaging shaft pivotally and adjustably mounted in a slot provided in one end of the handle. The flanged wheel-engaging shaft removably engages the cupped rim or hub of the wheel after it is removed from the automobile. An adjustable tire plug carriage sleeve is mounted on the handle. A plug insertion shaft having a bifurcated distal end is suspended downwardly from a pivotal attachment to the carriage sleeve. As the flanged bottom end of the vertical wheel engaging shaft is caused to engage the hub of the wheel, the handle is extended horizontally over the width of the tire tread. The tire plug carriage sleeve and suspended plug insertion shaft are adjusted and then secured on the handle in the appropriate location to facilitate alignment of a band-shaped, resilient repair plug. The plug is inserted between the bifurcations of the plug insertion shaft. Subsequent insertion of the repair plug in and removal of the plug insertion shaft from the opening is by lever operation of the handle. A problem with this tire repair device is that the flanged wheel-engaging shaft may assist in providing an anchoring point for the inserting lever, however, the flanged wheel-engaging shaft provides no such point during the extraction of the plug insertion shaft. Thus, the tool becomes cumbersome during at least half of the plugging operation.

Another problem with the prior tire repair devices is that some require specific types or designs of resilient plugs to be used, limiting the utility of the device to the availability of the specific resilient plugs. For example, U.S. Pat. No. 5,062,323 discloses a puncture repair device that uses a plug that is generally cylindrical with enlarged end portions and an interconnecting cylindrical shank portion. One end has a cylindrical head portion and a circumferential groove for engaging the insertion tool. The other end has a spherical portion.

Another problem with the aforementioned devices is that to facilitate the insertion of the tool into the tire tread, the hole is usually enlarged to the appropriate size of the plug by using a reaming device or a drill and following the hole of the penetrating object.

Another problem associated with the prior art devices and plugging means, is if the puncture is enlarged or reamed to accept the tire plugging device and/or plugging means, the enlarged hole further weakens the tire, which also requires a larger, stronger plugging means to stop the leak.

An additional disadvantage of the previously described devices is the obvious and unmistakable danger of personal injury when inserting the plug. As noted, the prior described tools include a pointed end that may slip during the course of attempting to insert the plug.

Thus, there is a need for a mobile tire plug insertion device that would allow the user to keep the wheel assembly on the automobile and safely allow the user to insert the plugging means into the hole or puncture from the penetrating object.

It is an object of the present invention to provide a pneumatic tire puncture repair tool that allows the user to safely facilitate inserting a plugging means of suitable size, configuration and resiliency into a tire having a hole from a penetrating object.

It is another object of the present invention to provide a pneumatic tire puncture repair tool that allows the user to safely facilitate inserting a plugging means of suitable size, configuration and resiliency into a tire having a hole from a penetrating object wherein the wheel does not have to be removed from the automobile or from the wheel rim.

Yet another object of the present invention to provide a pneumatic tire puncture repair tool that allows the user insert a plugging means of suitable size, configuration and resiliency into a tire having a hole from a penetrating object wherein the wheel is not removed from the automobile and the weight of the automobile is utilized to facilitate inserting the plugging means while the user's hands are in a position of safety during the plug insertion step of the process.

These and other objects and advantages of the present invention will become more apparent to those skilled in the art in view of the following description and the accompanying drawings wherein like parts and objects in the several views have similar reference numerals. It is to be understood that the inventive concept is not to be considered limited to the constructions disclosed herein but instead by the scope of the appended claims.

SUMMARY OF THE INVENTION

Briefly, the present invention is a pneumatic tire repair assembly for inserting a plugging means into a hole or puncture in the tire. The tire repair assembly is adapted to be rolled over by the wheel mounted tire and preferably while the tire is affixed to the automobile, the tire repair assembly having, in combination, a substantially resilient base member and a plug holding inserting means mounted to the base member and in an alternative embodiment, the inserting means is pivotally or moveably mounted to the base member.

BRIEF DESCRIPTION OF THE DRAWINGS

FIG. 1 is a perspective view of the tire repair assembly of the present invention illustrating the base member, and an inserting means mounted to the base member.

FIG. 2 is a bottom view of the base member and retaining means of the tire repair assembly of the present invention.

FIG. 3A is a perspective view of a substantially linear inserting means used in inserting the plug member into the tire puncture.

FIG. 3B is a perspective view of an arcuate inserting means used in inserting the plug member into the tire puncture.

FIG. 4 is a side view illustrating how the tire repair assembly of the present invention is used to insert a plug into a puncture or hole in a tire.

FIG. 5 is a side view illustrating how the tire and ground cooperate to insert the tire plug into the tire using the tire repair assembly of the present.

FIG. 6 is a side view illustrating how the tire repair assembly of the present invention substantially returns to a pre-deformation state after the deformation force is removed allowing the user to insert a hand to withdraw inserting means and remove the tire repair assembly.

FIG. 7 is a perspective view of another embodiment of tire repair assembly of the present invention wherein the insertion means is positioned at one end of the base member and pivotally mounted to the base member.

FIG. 8 is a top view of the embodiment illustrated in FIG. 7.

DETAILED DESCRIPTION OF THE INVENTION

Referring to FIGS. 1-5, the tire repair assembly of the present invention is generally represented by reference numeral 10. The tire repair assembly 10 is adapted for inserting into a hole or puncture all manner of puncture plugging means, (not shown), known to those skilled in the art and described in greater detail below. The tire repair assembly 10 includes a resilient, elongated base member 15 that is adapted to be sandwiched between a tire 50 and a hard surface 60 during insertion of the plugging means. The base member 15 includes a channel 20 that is positioned substantially along the transverse centerline of the base member 15. As used herein, the term "substantially" means a degree of variance from a specified location, position, or an amount of no more than 40%, and preferably no more than 20%. Accordingly, the channel 20 may be within 40% of the transverse centerline of the base member and still be within the description of the present invention.

The base member 15 is illustrated as having an arcuate or curvilinear design with a radius of curvature of from about 4 inches (10 centimeters (cm)) to about 25 inches (64 cm), preferably from about 5 inches (13 cm) to about 20 inches (51 cm) and more preferably from about 7 inches (18 cm) to about 15 inches (38 cm) and an overall length of from about 8 inches (20 cm) to about 15 inches (38 cm). Although the base member 15 is illustrated having an arcuate "dog-bone" configuration, one skilled in the art will understand that the base member 15 may be any configuration, geometric shape or design that facilitates the use and purpose of the tire repair assembly 10 of the present invention, i.e., to insert a plugging mean into a punctured tire as the tire repair assembly is driven over. The base member 15 may be fabricated from any type of rigid or semi-rigid material that has some degree of flexure. Non-limiting examples of such materials include ferrous metals and alloys such as steel, cast iron, stainless steel, or spring steel; nonferrous metals and alloys such as nickel and nickel alloys, copper and alloys, or titanium and alloys; organic nonmetallics such as polyethylene, acrylonitrile butadiene styrene (ABS), polyvinyl chloride (PVC), cellulose acetate butyrate (CAB) and other polyesters, polycarbonates, polypropylene, nylons, and acetals; wood or other appropriate materials. Preferably, the material used for the construction of the of the base member 15 would have most if not all of the following properties: relatively high strength, light weight (i.e., low density), non-brittle, and resistance to adverse environmental conditions. Semi-rigid materials, such as plasticized organic nonmetallics discussed above are also suitable provided the degree of plasticization does not significantly effect the resiliency of the base member 15 to substantially return to its pre-deformation configuration after the deformation force is removed.

Attached to the base member 15 is an inserting means 25. The inserting means 25 may be straight, as seen in FIG. 3A, or have an arcuate or curvilinear shape, as seen in FIG. 3B, that facilitates inserting the plugging means into the tire 50 during use. The inserting means 25 can be of a needle-like configuration having a length of from about one-half of an inch (1.25 cm) to about 6 inches (15 cm), and preferably is from about 1 inch (2.5 cm) to about 4 inches (10 cm). The inserting means 25 can be fabricated from any type of substantially rigid or semi-rigid material including those materials described above for the base member 15. The inserting means 25 includes a shaft 30 or 32, an attachment means 35 for affixing the inserting means 25 to the base member 15, and a means 40 for holding the repair plug. As used herein, "plugging means", "plug" and "repair plug" are used interchangeably to designate the resilient plug that is inserted to the tire to plug or close the puncture in the tire. The attachment means 35 is affixed to one end of the shaft 30 or 32 and the means 40 for holding the repair plug is affixed to another end of said shaft. Referring to FIGS. 3A and 3B, the attachment means 35 is illustrated as a ring having an orifice or opening in the shaft 30 and 32. Alternatively, the attachment means 35 may be any known mechanism for connecting one member to another. For example, the attachment means 35 may be a brad or rivet, a screw, bolt or thermal weld.

The holding means 40 can be any configuration that is adapted for holding a plug such that the plug is retained in the holding means 40 while inserting the plug into the tire, and in a preferred embodiment, will release the plug when the inserting means 25 is removed from the tire. Examples of such a holding means 40 includes a channel or a groove in the shaft 30 or 32, an eyelet, or in a preferred embodiment a forked device having at least two opposing elongated members 42 and 44. Desirably, the two opposing elongated members 42 and 44 define an eyelet or opening for capturing the plugging means while inserting the plug into the tire and will release the plug upon withdrawing the inserting means 25 from the tire. In a preferred embodiment, the opposing elongated members 42 and 44 further include a means 45 for temporarily holding the tire repairing device in the puncture. Examples of such a temporary holding means 45 are ridges or notches located on the outer surface of the opposing elongated members 42 and 44. The holding means 40 culminates in a tip 46 that is adapted to be placed into the puncture or hole to temporarily hold the tire repair assembly juxtaposed to the tire while the user rolls the tire forward to insert the inserting means 25 and plug into the puncture.

In an alternative embodiment of the present invention, the inserting means 25 is pivotally or moveably affixed to the base member 15 by inserting a substantially rigid retaining means 47 through the channel 20 to engage the attachment means 35. The substantially rigid retaining means 47 may be a steel pin of sufficient length and diameter to be either moveably or substantially rigidly retained within the channel 20 in the base member 15.

The plugging means is typically a shaped, solid, resilient repair plug that may be longitudinally extendable or stretchable. The repair plug member or plugging means may be made of any suitable rigid, or semi-rigid resilient material known to those skilled in the art, such as, a vulcanized or unvulcanized rubber, rubber-like materials, or other pliable, or stretchable resilient materials including layered or laminated type plug members. The plug member may further include one or more reinforcing threads implanted or impregnated into the plug for added strength and size stabilization. The repair plug member may be any, shape, design or configuration, including cylindrical, wedge shaped, or bow-tie. The only criteria for the plug member utilized with the present device is that the repair plug member be capable of being secured, and preferably releasably secured, to the holding means of the present invention. Non-limiting examples of suitable repair plug members are disclosed in U.S. Pat. Nos. 5,536,346 and 3,277,642, the entire disclosures of each being incorporated herein by reference.

Referring to FIGS. 4-6, a sequence of steps for the method of using the present invention is illustrated. In using the tire repair assembly 10 of the present invention, after removing the nail, screw, or other penetrating object, the user inserts the plug into the holding means 40 of the inserting means 25. An adhesive may be applied to the flexible elastomeric material comprising the repair plug. Depending on the type, size and configuration, plug may be folded in half as it is engaged in the holding means 40. The user then inserts the tip 46 into the open puncture until reaching the plug or repair material. This will temporarily seal the hole preventing air from further escaping the tire and properly position the inserting means 25 and base member 15 for more completely positioning the plug in the puncture. The vehicle is then driven in a direction, i.e., either forward or rearward depending on the placement of the tire repair assembly 10 on the tire, that will sandwich the tire repair assembly 10 between the tire 50 and the hard surface 60. This forcibly inserts the plug into the puncture. During inserting the plug into the puncture, the soft plug substantially deforms to conform to the size of the puncture hole, effectively and efficiently sealing the puncture. The base member 15 will be deformed in a manner that facilitates insertion of the inserting means 25 into the puncture. As the tire continues to rotate, the base member 15 will substantially rebound to its original configuration. This rebounding will partially remove the inserting means 25 and allowing the user to slip their hand between the base member 15 and the tire 50. The repair plug of the selected shape and configuration is passed into the puncture hole and then forcibly drawn into tight abutting sealing pressure engagement with internal surfaces of a tire to positively seal the puncture hole. The user then can remove the plug from the holding means 45 and the tire repair assembly 10 from the tire.

Referring to FIGS. 7 and 8, an alternative embodiment of the present invention is illustrated. The alternative embodiment of the tire repair assembly 100 includes a resilient, elongated base member 115 that is adapted to be sandwiched between a tire and a hard surface during insertion of the repair plug. The base member 115 includes a channel 120 that is positioned transversely at an end of the base member 115.

The base member 115 is illustrated as having an arcuate or curvilinear shape and in one embodiment has a slight or modified "boomerang" design with varied radii of curvatures of from about 4 inches (10 centimeters (cm)) to about 25 inches (64 cm), preferably from about 5 inches (13 cm) to about 20 inches (51 cm) and more preferably from about 7 inches (18 cm) to about 15 inches (38 cm) aid an overall length of from about 8 inches (20 cm) to about 15 inches (38 cm). As described above, the base member 115 may be fabricated from any type of rigid or semi-rigid material that has some degree of flexure.

Pivotally attached to the end of the base member 115 is an inserting means 125. The inserting means 125 may be straight or have an arcuate or curvilinear shape, as seen in FIGS. 3A and 3B, that facilitates inserting the repair plug into the tire during use. The inserting means 125 can have a length of from about one-half of an inch (1.25 cm) to about 6 inches (15 cm), and preferably is from about 1 inch (2.5 cm) to about 4 inches (10 cm). The inserting means 125 can be fabricated from any type of substantially rigid or semi-rigid material including those materials described above for the base member 15.

The inserting means 125 includes a shaft 130, an attachment means 135 for moveably affixing the inserting means 125 to the base member 115, and a means 140 for holding the repair plug. The attachment means 135 is affixed to one end of the shaft 130 and the means 140 for holding the repair plug is affixed to another end of said shaft 130. As seen in FIGS. 3A and 3B, the attachment means 135 is illustrated as a ring having an orifice or opening in the shaft 30 or 32. Alternatively, the attachment means 135 may be any known mechanism for moveably connecting a moveable member to another. For example, the attachment means 35 may be a loosely applied brad or rivet, a screw, bolt thermal weld or any other means where the shaft 130 may be moveably connected to the base member 115.

The holding means 140 can be any configuration that is adapted to hold a plug such that the plug is retained in the holding means 140 while inserting the plug into the tire, and in a preferred embodiment the holding means 140 will release the plug when the inserting means 125 is removed from the tire. Examples of such a holding means 140 includes a channel or a groove in the shaft 130, an eyelet, or preferably a forked device having at least two opposing elongated members 142 and 144. Desirably, the two opposing elongated members 142 and 144 are arcuate and define an eyelet or opening for capturing the repair plug while inserting the plug into the tire, and will release the plug upon withdrawing the inserting means 125 from the tire. In a preferred embodiment, the opposing elongated members 142 and 144 further include a means for temporarily holding the tire repairing device in the puncture similar to that described above. Examples of such a temporary holding means include ridges or notches located on the outer surface of the opposing elongated members 142 and 144. The holding means 140 culminates in a tip 146 that is adapted to be placed into the puncture or hole to temporarily hold the tire repair assembly 110 juxtaposed to the tire while the user rolls the tire forward to insert the inserting means 125 and plug into the puncture.

Again referring to FIGS. 7 and 8, another embodiment of the tire repair assembly is illustrated wherein the inserting means 125 is pivotally affixed to the base member 115 by inserting a substantially rigid retaining means 147 through the channel 120 to engage the attachment means 135. The substantially rigid retaining means 147 may be a steel pin of sufficient length and diameter to be either moveably or substantially rigidly retained within the channel 120.

Use of this embodiment of the tire repair assembly 100 is similar to that described above with the following exception, after the tire has rolled over the tire repair assembly 100 the user flips the base member substantially 180 degrees so that the curvature of the base member 115 acts as a fulcrum against the tire. The user then presses on the free end distal from the inserting means 125 to extract the inserting means 125 from the tire and to disengage the plug from the holding means 140.

One skilled in the art would further understand that the inserting means 25 and 125 could alternatively be fabricated from a substantially resilient material suitable for repairing the puncture and which would be used in place of the plugging means described above. Thus, in this alternative embodiment, the inserting means 25 and 125 would be fabricated from a repair plug type of material so that once inserted into the puncture the inserting means 25 and 125 or a portion thereof would be separated from the base member 15 and 115 and retained in the tire to plug the puncture hole.

The present invention is illustrated in greater detail by the specific example presented below. It is to be understood that this example is an illustrative embodiment and is not intended to be limiting of the invention, but rather are to be construed broadly within the scope and content of the appended claims.

A tire repair assembly in accordance with the present invention was made using one-half inch (1.25 cm) thick LEXAN® sheets. A base member was fabricated approximately 2 inches (5 cm) wide at the ends and 1 inch (2.5 cm) wide at the center The base member was about 12 inches (30.5 cm) long and trimmed to be thinner at the ends. A mould was made from a piece of wood having a 7 inch radius. The mould and sheet of LEXAN® were placed in an oven at 320° F. until the LEXAN® sheet conformed to the mould. The mould and curved base member were then removed from the oven and the base member allowed to cool before separating the base member from the mould. A channel was transversely drilled through about the center of the base member to accept a retaining pin for holding the inserting means to the base member. A slot was cut in the inside center of the base to insert the inserting means through to engage the retaining pin. The inserting means was made from a metallic material. Several tests were performed on different types of tires, all of which successfully plugged the holes.

In another embodiment of the present invention, one or more parts or portions of the tire repair assembly may be coated or contain a material that is highly reflective of light and/or may have some degree of fluoresce to assist the user in finding the device during periods of low light.

In another embodiment of the present invention, the tire repair assembly may include a powered light source secured to a portion of the assembly to aid the user in repairing the tire during periods of low light.

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention.

I claim:

1. A tire repairing assembly for inserting a rigid or semi-rigid plugging means into a punctured pneumatic tire, said tire repairing assembly comprising:
   a. a resilient base member adapted to be rolled over by a tire while still mounted to a wheel;
   b. an inserting means comprising a shaft; and
   c. a means for attaching the inserting means to the base member, wherein said means for attaching the inserting means to the base member is positioned at one end of said shaft, and positioned at another end of said shaft is a means for holding the plugging means.

2. The tire repairing assembly of claim 1 wherein said base member has an arcuate shape with a radius of curvature of from about 4 inches to about 25 inches.

3. The tire repairing assembly of claim 1 wherein said inserting means is moveably attached to said base member.

4. The tire repairing assembly of claim 1 wherein said inserting means has a curvilinear configuration.

5. The tire repairing assembly of claim 1 wherein said means for holding said plugging means is selected from the group consisting of a channel in said shaft, a groove in said shaft, an eyelet, and a forked device having at least two opposing elongated members.

6. The tire repairing assembly of claim 5 wherein said at least two opposing elongated members have an arcuate configuration and which define an eyelet for capturing said plugging means during insertion of the plugging means into the tire.

7. The tire repairing assembly of claim 6 wherein said inserting means has a length of from about one-half inch to about 6 inches.

8. The tire repairing assembly of claim 1 further comprising a substantially rigid retaining means affixed to said base member, and wherein said means for attaching the inserting means to the base member moveably engages said retaining means.

9. The tire repairing assembly of claim 8 wherein said substantially rigid retaining means is substantially centrally affixed to said base member.

10. The tire repairing assembly of claim 8 wherein said substantially rigid retaining means is affixed to said base member at one end of said base member.

11. A tire repairing assembly for inserting a rigid or semi-rigid plugging means into a punctured pneumatic tire, said tire repairing assembly comprising:
   a. a resilient base member adapted to be rolled over by a tire while still mounted to a wheel;
   b. a substantially rigid retaining means affixed to said base member;
   c. an inserting means comprising a shaft; and
   d. a means for attaching the inserting means to the base member by engaging the substantially rigid retaining means, said means for attaching the inserting means being affixed to one end of said shaft, and affixed to another end of said shaft is a means for holding the plugging means.

12. The tire repairing assembly of claim 11 wherein said base member has an arcuate configuration with a radius of curvature of from about 4 inches to about 25 inches.

13. The tire repairing assembly of claim 11 wherein said shaft has a curvilinear configuration.

14. The tire repairing assembly of claim 11 wherein said means for holding said plugging means is a forked device having at least two opposing arcuate elongated members, wherein said at least two opposing elongated members define an eyelet for capturing the tire repair plug during insertion of the plug into the tire and which release the plug upon withdrawing the inserting means from the tire, said at least two opposing arcuate elongated members further comprising holding means selected from the group consisting of exterior positioned ridges and notches for temporarily holding said tire repairing assembly in the puncture.

15. The tire repairing assembly of claim 14 wherein said inserting means has a length of from about 1 inch to about 4 inches.

16. The tire repairing assembly of claim 11 wherein said substantially rigid retaining means is substantially centrally affixed to said base member.

17. The tire repairing assembly of claim 11 wherein said substantially rigid retaining means is affixed to said base member at one end of said base member.

18. A tire repairing assembly for inserting a rigid or semi-rigid plugging means into a punctured pneumatic tire, the assembly being adapted to be rolled over by a tire while still mounted to a wheel, said tire repairing assembly comprising:
   a. an arcuate resilient base member;
   b. a substantially rigid retaining means affixed to one end of said base member;
   c. an inserting means pivotally mounted to said base member by said substantially rigid retaining means wherein said inserting means comprises a shaft; and
   d. a means for attaching the inserting means to the base member by engaging the substantially rigid retaining means, said means for attaching the inserting means being affixed to one end of said shaft, and affixed to another end of said shaft is a means for holding the plugging means.

19. The tire repairing assembly of claim 18 wherein said substantially rigid retaining means is positioned substantially along a longitudinal axis of said arcuate resilient base member.

20. The tire repairing assembly of claim 19 wherein said substantially rigid retaining means is positioned at one end of said arcuate resilient base member.

21. A tire repairing assembly for plugging a punctured pneumatic tire, the assembly being adapted to be rolled over by a tire while still mounted to a wheel, said tire repairing assembly comprising:
   a. an arcuate resilient base member; and
   b. an inserting means mounted to said base member wherein said inserting means comprises a shaft fabricated from a substantially resilient material suitable for use as a tire repair plug.

22. The tire repairing assembly of claim 21 wherein said inserting means is moveably mounted to the base member.

23. The tire repairing assembly of claim 22 wherein said inserting means is moveably mounted at one end of the base member.

24. The tire repairing assembly of claim 21 wherein said inserting means has a curvilinear configuration.

25. The tire repairing assembly of claim 21 wherein said inserting means is substantially centrally affixed to said base member.

* * * * *